Aug. 17, 1965

R. W. DE MONTE 3,201,719

SIMULATION NETWORK

Filed Oct. 20, 1961

INVENTOR
R. W. DE MONTE
BY
Ralph P. Holcomb
ATTORNEY

United States Patent Office 3,201,719
Patented Aug. 17, 1965

3,201,719
SIMULATION NETWORK

Robert W. De Monte, Berkeley Heights, N.J., assignor to Bell Telephone Laboratories, Incorporated, New York, N.Y., a corporation of New York Filed Oct. 20, 1961, Ser. No. 146,501
6 Claims. (Cl. 333—23)

This invention relates to wave transmission networks and more particularly to simulation networks or artificial lines.

The object of the invention is to simulate the image admittance and propagation of a section of transmission line within a sheath, such as a cable. Related objects are to increase the accuracy, widen the band, simplify the structure, and reduce the cost and size of such a simulation network.

Cables comprising a number of pairs of insulated conductors surrounded by a conductive sheath find extensive use in wave transmission systems. The sheath is generally grounded or otherwise fixed in potential. It is often desirable to have a network which will accurately simulate both the image admittance and the propagation of a section of such a conductor pair within a sheath or cable. Simulation networks of this type are extensively used in planning new communication systems and in testing component apparatus under simulated operating conditions.

The network in accordance with the present invention closely simulates a section of two-conductor transmission line within a sheath over a wide band of frequencies. In practice, simulation within half a percent in the resistance and the reactance of the image admittance and in the real and the imaginary parts of the propagation constant have been attained over a frequency range of 50 to 10,000 cycles per second. For this accuracy, the structure requires the minimum number of component elements, thus reducing the cost and size.

The network is in the form of a symmetrical lattice with two capacitive shunt branches connected at the respective ends thereof. The capacitance of each of these shunt branches is equal to half of the distributed capacitance between the conductors and the sheath of the line section to be simulated. The admittances of the series and diagonal branches of the lattice are evaluated in terms of the image admittance and the propagation constant of the line section at a selected frequency to provide perfect simulation at this frequency. With proper realization of these admittances, excellent simulation is obtained over a wide range of frequencies extending on both sides of the selected frequency. In the specific embodiment shown, each series branch of the lattice comprises a resistor equal in value to one-half of the direct-current resistance of the two conductors of the line section connected in series. Each diagonal branch comprises the series combination of a resistor and a capacitor. For the longer line sections, each series branch may include also a series inductor.

The nature of the invention and its various objects, features, and advantages will appear more fully in the following detailed description of the typical embodiments illustrated in the accompanying drawing, in which.

Figure 1:
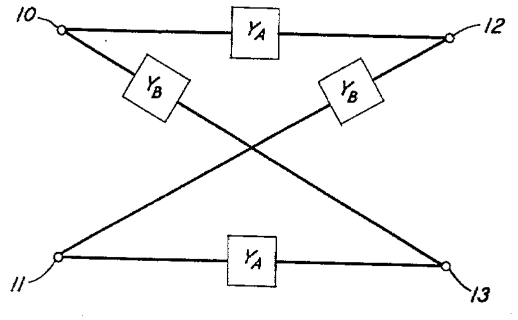
FIG. 1 is the schematic circuit of a lattice network used in explaining the invention.

The symmetrical lattice shown in FIG. 1 comprises two equal series admittances $Y_A$, $Y_A$ and two equal diagonal admittances $Y_B$, $Y_B$ connected between a pair of input terminals 10–11 and a pair of output terminals 12–

13. It is known that such a network will simulate exactly the image admittance $Y_I$ and the propagation of a uniform section of transmission line at all frequencies if $$Y_A = Y_I \cot h\frac{P}{2} \qquad (1)$$

and $$Y_B = Y_I \tan h\frac{P}{2} \qquad (2)$$

where P is the propagation constant of the section.

Figure 2:
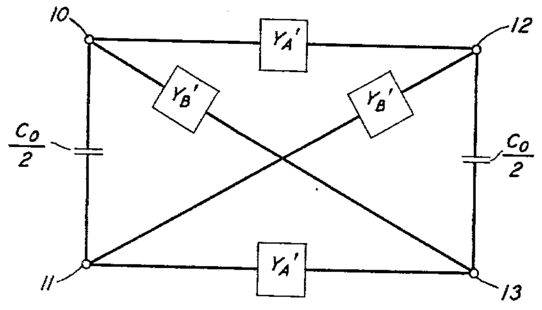
FIG. 2 is a generalized schematic circuit of a simulation network in accordance with the present invention.

The network in accordance with the invention shown in FIG. 2 is the exact equivalent of the lattice of FIG. 1 at a selected radian frequency $\omega_0$. In FIG. 2, two end shunt capacitors, each of value $C_0/2$, have been added. Also, the admittances provided by these capacitors at $\omega_0$ have been subtracted from the branches of the lattice. Thus, at $\omega_0$, each modified series admittance is given by $$Y_A' = Y_I \cot h\frac{P}{2} - C_0\omega_0/2 \qquad (3)$$

and each modified diagonal admittance is given by $$Y_B' = Y_I \tan h\frac{P}{2} - C_0\omega_0/2 \qquad (4)$$

where P is the propagation constant of the line section at $\omega_0$. When the capacitance $C_0$ is made equal to the distributed capacitance between the pair of conductors and the sheath of the section, the network of FIG. 2 will give excellent simulation not only at $\omega_0$ but over a wide range on either side of $\omega_0$. In practice, $\omega_0$ is generally chosen somewhat above the middle of the desired operating range.

Figure 3:
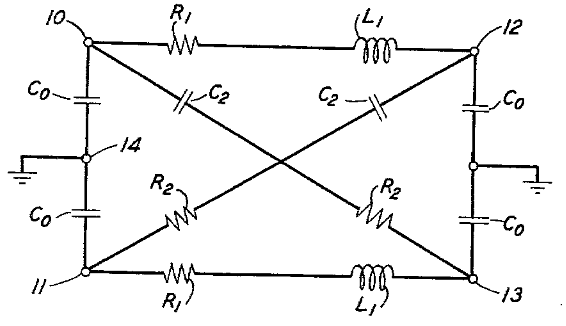
FIG. 3 is a schematic circuit of one embodiment of the network shown in FIG. 2.

FIG. 3 shows a more specific embodiment of the network of FIG. 2. In FIG. 3, each end shunt capacitance is furnished by two equal, series-connected capacitors each of value $C_0$, with a common terminal 14 which may be grounded to provide a balanced-to-ground structure. Each series branch comprises a resistor $R_1$ equal in value to one-half of the direct-current resistance of the two conductors of the line section connected in series. Each diagonal branch comprises a resistor of value $R_2$ and a capacitor of value $C_2$ in series. The values of $R_2$ and $C_2$ are chosen to provide the required admittance $Y_B'$, at $\omega_0$. Therefore $R_2$ in ohms is equal to the real part of $$\frac{1}{Y_I \tan h\frac{P}{2} - C_0\omega_0/2}$$

and $C_2$ in farads is equal to the imaginary part of $$\frac{Y_I \tan h\frac{P}{2} - C_0\omega_0/2}{\omega_0}$$

The structure just described, with the inductors $L_1$ omitted, will generally be found satisfactory for short line sections, under about 250 feet. For longer sections, the greater accuracy obtained by adding the inductors generally justifies their inclusion. The value of $L_1$ is chosen to provide the required admittance $Y_A'$ at $\omega_0$. Therefore, the value of $L_1$ in henries is equal to the imaginary part of $$\frac{1}{\omega_0\left(Y_I \cot h\frac{P}{2} - C_0\omega_0/2\right)}$$

As an example, a network to simulate 3000 feet of 22-gauge telephone cable will now be presented. In this cable, the direct-current resistance is 173 ohms per mile and, at $\omega_0$, $$P = 0.473 + j0.567 \qquad (5)$$

in nepers and radians per mile and $$Y_I = 3216 + j2657 \text{ micromhos} \qquad (6)$$

The component elements will have the following values:

$C_0$=0.02562 microfarad
$C_2$=0.01047 microfarad
$L_1$=128 microhenries
$R_1$=49.15 ohms
$R_2$=107 ohms It is to be understood that the above-described arrangements are only illustrative of the application of the principles of the invention. Numerous other arrangements may be devised by those skilled in the art without departing from the spirit and scope of the invention.

What is claimed is:

1. A network for simulating the image admittance $Y_I$ and the propagation of a section of transmission line in the form of a pair of conductors with a surrounding sheath comprising a lattice and two capacitive shunt branches connected to the respective ends thereof, the capacitance of each shunt branch being equal to half of the distributed capacitance $C_0$ between the conductors and the sheath of the line section, each series branch of the lattice comprising a resistor equal in value to one-half of the direct-current resistance of the two conductors of the line section connected in series, and the admittance of each diagonal branch of the lattice being equal to $$Y_I \tan h\frac{P}{2}-C_0\omega_0/2$$

at a selected radian frequency $\omega_0$ within the operating range, where P is the propagation constant of the line section at $\omega_0$.

2. A network in accordance with claim 1 in which each shunt branch includes two series-connected capacitors each of value $C_0$ and a terminal common to the capacitors.

3. A network in accordance with claim 1 in which each diagonal branch comprises the series combination of a resistor and a capacitor.

4. A network for simulating a section of two-conductor transmission line within a sheath comprising a symmetrical lattice and two shunt branches connected at the respective ends thereof, each series branch of the lattice comprising a resistor equal in value to one-half of the direct-current resistance of the two conductors of the line section connected in series, each diagonal branch of the lattice comprising the series combination of a resistor of value $R_2$ and a capacitor of value $C_2$, and each of the shunt branches including a capacitance equal to half of the distributed capacitance $C_0$ between the conductors and the sheath of the line section, where $R_2$ is equal to the real part of $$\frac{1}{Y_I \tan h\frac{P}{2}-C_0\omega_0/2}$$

$C_2$ is equal to the imaginary part of $$\frac{Y_I \tan h\frac{P}{2}-C_0\omega_0/2}{\omega_0}$$

$Y_I$ is the image admittance and P is the propagation constant of the line section at $\omega_0$, and $\omega_0$ is a selected radian frequency in the operating band.

5. A network for simulating the image admittance $Y_I$ and the propagation of a section of two-conductor transmission line surrounded by a conductive sheath comprising a lattice and two capacitive shunt branches connected at the respective ends thereof, each shunt branch having a capacitance equal to half of the distributed capacitance $C_0$ between the conductors and the sheath of the line section to be simulated, each series branch of the lattice comprising the series combination of a resistor of value $R_1$ and an inductor of value $L_1$, the admittance of each diagonal branch of the lattice being equal to $$Y_I \tan h\frac{P}{2}-C_0\omega_0/2$$

at a selected radian frequency $\omega_0$ within the operating range, where P is the propagation constant of the line section at $\omega_0$, $R_1$ is equal to one-half of the direct-current resistance of the two conductors of the line section connected in series, and $L_1$ is equal to the imaginary part of $$\frac{1}{\omega_0\left(Y_I \cot h\frac{P}{2}-C_0\omega_0/2\right)}$$

6. A network for simulating the image admittance $Y_I$ and the propagation of a section of transmission line in the form of two conductors and a surrounding sheath comprising a lattice and two capacitive shunt branches connected one at each end of the lattice, each shunt branch having a capacitance equal to half of the distributed capacitance $C_0$ between the two conductors and the sheath of the line section to be simulated, each series branch of the lattice comprising the series combination of a resistor of value $R_1$ and an inductor of value $L_1$, and each diagonal branch of the lattice comprising the series combination of a resistor of value $R_2$ and a capacitor of value $C_2$, where $R_1$ is equal to one-half of the direct-current resistance of the two conductors of the line section, connected in series $L_1$ is equal to the imaginary part of $$\frac{1}{\omega_0\left(Y_I \cot h\frac{P}{2}-C_0\omega_0/2\right)}$$

$R_2$ is equal to the real part of $$\frac{1}{Y_I \tan h\frac{P}{2}-C_0\omega_0/2}$$

$C_2$ is equal to the imaginary part of $$\frac{Y_I \tan h\frac{P}{2}-C_0\omega_0/2}{\omega_0}$$

P is the propagation constant of the line section at $\omega_0$, and $\omega_0$ is a selected radian frequency within the operating range.

References Cited by the Examiner

UNITED STATES PATENTS

| | | | |
|---|---|---|---|
| 1,643,332 | 9/27 | Campbell | 333—23 |
| 1,767,199 | 6/30 | Bartlett | 333—23 |
| 1,788,526 | 1/31 | Johnson | 333—23 |
| 1,799,794 | 4/31 | Horton | 333—23 |
| 1,958,742 | 5/34 | Cauer | 333—23 |
| 2,183,123 | 12/39 | Mason | 333—75 |
| 2,965,859 | 12/60 | De Monte | 333—74 |

HERMAN KARL SAALBACH, *Primary Examiner.*